(No Model.)
F. W. MOSELEY.
COMPOUND FAUCET.
No. 306,170. Patented Oct. 7, 1884.
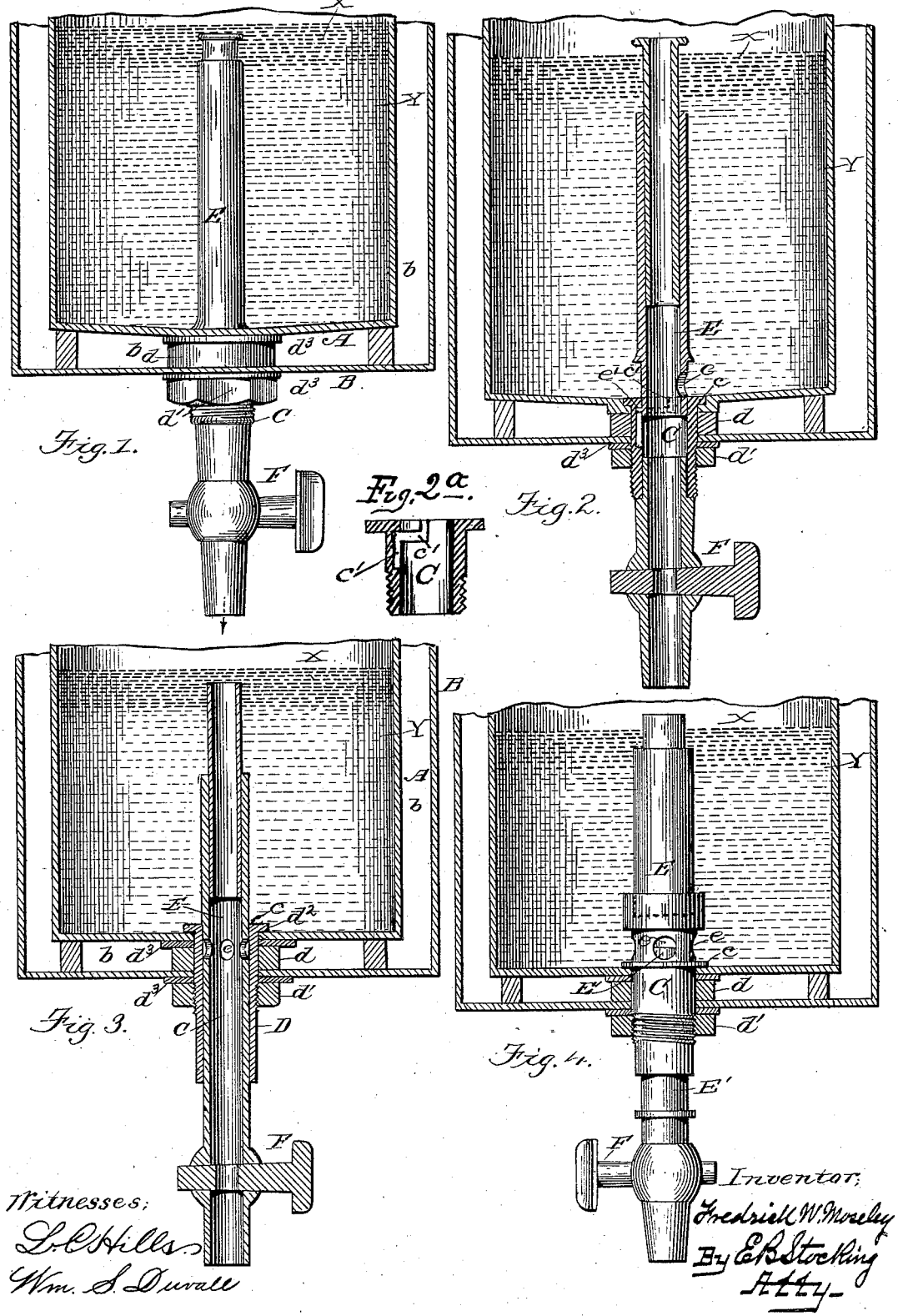

UNITED STATES PATENT OFFICE.

FREDRICK W. MOSELEY, OF POULTNEY, VERMONT.

COMPOUND FAUCET.

SPECIFICATION forming part of Letters Patent No. 306,170, dated October 7, 1884.

Application filed February 16, 1884. (No model.)

*To all whom it may concern:*

Be it known that I, FREDRICK W. MOSE-LEY, a citizen of the United States, residing at Poultney, in the county of Rutland and State of Vermont, have invented certain new and useful Improvements in Compound Faucets, of which the following is a specification, reference being had therein to the accompanying drawings.

The object of my invention in this instance is to provide a compound faucet through which liquids of different specific gravities may at will be withdrawn from a single vessel or from separate vessels, and through the bottom of the same.

In companion applications, Cases A, B and D, I have shown and claimed certain novel features herein illustrated and described but not herein claimed.

In the drawings, Figure 1 is a side elevation of a faucet constructed in accordance with my invention, and represented as connected with a jacketed can or vessel, shown in vertical section. Fig. 2 is a vertical section of the faucet and jacketed vessel, and Fig. 2ª is a sectional detail of the discharge-tube, showing the bayonet-slot $c'$ therein. Figs. 3 and 4 are modifications.

Like letters refer to like parts in all the figures.

In separating liquids of different specific gravities, when contained in one vessel, provision for surface and for low drainage is required, and when it is desired to select at will either the lighter or heavier liquids for withdrawal, the means employed must be adapted for change from performing the one operation to the performance of the other, and, as in this instance shown, additional means may be provided for controlling the flow or final discharge of the separated liquid.

In the above-mentioned companion Cases A, B, and D, I have disclosed means for the performance of the desired above-mentioned functions, both from the side and from the bottom of a vessel, and I do not therefore herein broadly claim all novel features shown, but specifically point out in the claims certain features not shown in said cases, and features whereby my invention is adapted for discharging liquids at the bottom of a vessel. Furthermore, as my invention is adapted for use in all arts wherein liquids of different gravities and liquids and any solids or sediments therein are to be separated, I do not confine said invention to a use in any particular art, but merely select that of cream raising and separating as and for the purpose of rendering my invention clear and readily understood.

It is apparent that in oil-distillation, wine-bottling, and many other arts my invention is equally useful as in cream-raising.

A represents any suitable vessel, which may or may not, as desired, be suitably supported in another vessel or jacket, B, whereby a space, $b$, around the vessel A is provided for the reception of heating or cooling agents to facilitate the production or sustenance of a separation of any liquids of varied gravities within the vessel A, as in the dairy arts where the deep setting or Swedish method is practiced; or the jacket or vessel B may be omitted. Through the bottoms of both vessels I pass what I hereinafter designate as a "discharge-tube," C, which may or may not be and serve the function of a coupler of the two vessel-bottoms. When not serving such function, as in Fig. 3, and when two vessels are used, I then provide any ordinary coupler, as D, which, with the usual space-block, $d$, and nut $d'$, serves to bind the vessels and the essential elements of the faucet tightly against leakage at the openings in the bottom of the vessels. It is apparent that if but one vessel, as A, were employed, the nut $d'$ would be set against the outer surface of the bottom of such vessel, while a shoulder, $c$, on the discharge-tube or a similar shoulder, $d^2$, on the coupler would be drawn snugly against the inner surface of the vessel A, or into any suitable depression or seat formed therein, as shown in Figs. 4 and 2, respectively. Any suitable packing, $d^3$, may or may not be used.

For surface-drainage I employ a telescopic pipe, E, the lower section of which is provided with ports $e$, and is fitted to slide vertically in the discharge-tube C. The surface-drainage pipe E may extend partly or entirely through the discharge tube or coupler; or, as shown in Fig. 4, its ports $e$ may be formed in the discharge-tube, in which case the extension E' of the surface-drainage pipe is separate and acts as a means of governing the flow of liquid through said ports, or, as shown in Fig. 3, forms a discharge-tube in itself.

In the constructions shown I have provided a stop-cock, F, to govern the final discharge of either liquid from the vessel A.

Letter X represents the lighter liquid, (as cream,) and Y the heavier, (as milk,) and it will be seen that, as in Figs. 2 and 4, the drainage-pipe being projected above the surface of the former and having its ports opened to the latter, the withdrawal of the latter into the discharge-tube takes place, and by opening and closing the stop-cock the complete withdrawal of the heavier liquid may be controlled, while, as in Figs. 1 and 2, by the depression of the drainage-pipe below the upper surface of the lighter liquid, and the closing of its ports, the withdrawal of the lighter liquid takes place.

In Fig. 2 I illustrate by dotted lines a bayonet-slot, c', which, in connection with a pin, e', projecting from the pipe E, may be employed to prevent the entire separation of the pipe from the discharge-tube when exposing the ports e; but I do not limit my invention to such minor details, as I deem a removable surface-drainage pipe an advantage.

In Fig. 4 the discharge-tube, serving as a coupler, is adapted at its upper end to receive the lower end of the drainage-pipe, as shown by dotted lines, and, although advantageous for cleaning and other purposes, I do not limit my invention to such specific construction in this respect. In this modification it will be seen that by sliding the extension E' upwardly the ports e are closed, and they are opened by a downward movement of said extension. I do not restrict my invention in this instance to any particular form of discharge-tube, provided it be adapted to pass through the bottom of a vessel, and it, or a surface-drainage pipe connected therewith, is formed with ports which permit of low drainage.

My invention in this instance has reference to and consists, broadly, of a faucet passing through the bottom of a vessel, and adapted to perform the functions of surface and low drainage at will, and the specific construction of the main and subsidiary elements employed may be varied in any manner and to any extent within the skill of persons conversant with the manufacture of similar devices.

It will be noticed that when the surface-drainage pipe is projected above the lighter liquid and the ports e are closed no liquid whatever can escape from the vessel. In other words, my surface-drainage pipe and discharge-tube constitute in themselves a stop-cock, and I therefore do not limit my invention to a use thereof with the stop-cock F, but merely apply that stop-cock for the advantage of intermittently withdrawing liquid from either stratum in the vessel A, as is desired in a restaurant, milk-depot, or hotel, where milk and cream are dispensed in small quantities. Furthermore, although shown passing through the bottom of a vessel, it is evident that the principal elements employed may be passed through a side of a vessel, and in a measure produce the desired results, by inclining at a suitable angle the drainage-pipe and discharge-tube, so as to reach both strata of the liquid therein, as has been done heretofore with other surface-drainage pipes.

By reference to Fig. 3 it will be seen that I may accomplish the designed purpose of independent withdrawal of lighter and heavier liquids without a telescopic upper extension to the surface-drainage pipe, the only requisite being that the port or ports e shall be sufficiently below the upper end of said pipe E to permit of its projection above the upper liquid without exposing said port or ports to the lower liquid. Simply sliding the integral discharge-tube and surface-drainage pipe within the coupler will produce either drainage desired.

The advantage of an entirely removable surface-drainage pipe is, that it gives access to the discharge-tube and its ports for cleaning purposes, and permits of an increased capacity over the ports for low drainage, in that the discharge-tube is an enlarged low-drainage port. In the construction shown in Fig. 2 the port e may therefore be entirely omitted, as they or it is omitted from the surface-drainage pipe in the construction shown in Fig. 4. In this case, as in the construction shown in Fig. 3, the upper telescopic section of the surface-drainage pipe may be omitted, and the sliding movement of the pipe itself in the coupler be availed for surface-drainage.

I have used the expression that the surface-drainage pipe and discharge-tube are "in line with each other," and although this expression is strictly accurate as regards the construction shown in Fig. 2, in that the lower portion of the surface-drainage pipe is formed as a part of the discharge-tube, yet I do not limit my invention to an exact alignment of these two elements, as the direct communication of one with the other may exist without absolute alignment. So, also, direct communication would exist if the said elements were not exactly concentric with each other, and I therefore use the terms "in line or concentric with each other" in a liberal sense.

Having described my invention and its operation, what I claim is—

1. A compound faucet comprising a surface-drainage pipe and a discharge-tube, one of which is constructed to act as a low-drainage port, and one of which is constructed to move in line or concentric with the other, substantially as specified.

2. A compound faucet comprising a movable surface-drainage pipe and a discharge-tube arranged in line with each other, the said pipe forming a continuation of said tube, substantially as specified.

3. The combination of a vessel, a surface-drainage pipe having a port, and a discharge-tube arranged substantially concentric with said pipe, the combination being and operating for surface and for low drainage, substantially as specified.

4. The combination of the vessel A, the surface-drainage pipe E, arranged therein and substantially concentric with the discharge-tube C, having a shoulder, $c$, the packing $d$, and binding-nut $d'$, substantially as specified.

5. The combination of the telescopic pipe E, having a port, $e$, the discharge-tube C, and the stop-cock F, substantially as shown and described.

6. The combination of the vessels A B, the discharge-tube having the shoulder $c$ or $d^2$, respectively, spacing $d$, and nut $d'$, with the surface-drainage pipe E, having a port, $e$, substantially as shown and described.

7. The combination of the vessels A B, the tube C, having shoulder $c$, packing $d$, and nut $d'$, stop-cock F, and pipe E, substantially as shown and described.

In testimony whereof I affix my signature in presence of two witnesses.

FREDRICK W. MOSELEY.

Witnesses:
E. B. STOCKING,
WM. S. DUVALL.